(12) United States Patent
Roberge

(10) Patent No.: US 9,603,308 B2
(45) Date of Patent: Mar. 28, 2017

(54) CONTINUOUS ROUND BALER WITH VARIABLE CONVEYOR

(71) Applicant: CNH Industrial Canada, LTD., Saskatoon (CA)

(72) Inventor: Martin J. Roberge, Saskatoon (CA)

(73) Assignee: CNH Industrial Canada, LTD., Saskatchewan (CA)

( * ) Notice: Subject to any disclaimer, the term of this patent is extended or adjusted under 35 U.S.C. 154(b) by 0 days.

(21) Appl. No.: 14/316,162

(22) Filed: Jun. 26, 2014

(65) Prior Publication Data

US 2015/0373915 A1 Dec. 31, 2015

(51) Int. Cl.
*A01F 15/07* (2006.01)
*A01F 15/08* (2006.01)

(52) U.S. Cl.
CPC ...... *A01F 15/0705* (2013.01); *A01F 15/0883* (2013.01)

(58) Field of Classification Search
CPC .... A01F 15/07; A01F 15/071; A01F 15/0705; A01F 15/0883; A01F 2015/0735; A01F 2015/074; A01F 2015/075; A01F 2015/077; A01D 39/005; A01D 43/006
USPC . 100/2, 35, 40, 76, 77, 87, 88; 56/341, 343, 56/DIG. 1
See application file for complete search history.

(56) References Cited

U.S. PATENT DOCUMENTS

| | | | |
|---|---|---|---|
| 4,011,711 A | 3/1977 | Mast | |
| 4,062,172 A * | 12/1977 | Rice | A01F 15/0705 100/77 |
| 4,534,285 A * | 8/1985 | Underhill | A01F 15/0705 100/88 |
| 4,667,592 A * | 5/1987 | Pentith | A01F 15/0705 100/77 |
| 4,691,503 A | 9/1987 | Frerich | |
| 5,136,831 A * | 8/1992 | Fell | A01F 15/0705 100/88 |
| 5,979,141 A | 11/1999 | Phillips | |
| 5,996,307 A | 12/1999 | Niemberg et al. | |
| 6,247,291 B1 | 6/2001 | Underhill | |
| 6,729,118 B2 * | 5/2004 | Viaud | A01F 15/0705 100/88 |
| 7,322,167 B2 | 1/2008 | Chapon et al. | |
| 7,430,959 B2 | 10/2008 | Routledge | |
| 8,733,241 B2 * | 5/2014 | Roberge | A01F 15/0705 100/88 |
| 2011/0168038 A1 * | 7/2011 | Viaud | A01F 15/07 100/88 |
| 2012/0204738 A1 * | 8/2012 | Reijersen Van Buuren | A01F 15/0705 100/40 |

(Continued)

FOREIGN PATENT DOCUMENTS

EP 0254337 A1 1/1988

*Primary Examiner* — Jimmy T Nguyen
(74) *Attorney, Agent, or Firm* — Peter K. Zacharias; Patrick M. Sheldrake

(57) ABSTRACT

A crop harvesting system for continuous round baling is described that with a first and second bale chamber and a conveyor system in operable communication with the first and second bale chambers. The crop harvesting system can have at least three bale carriers, at least two serpentine systems to facilitate movement of the bale into and out of the first and second bale chambers. The crop harvesting system can be integrated into an agricultural harvester such as a baler or combine.

20 Claims, 11 Drawing Sheets

(56) References Cited

U.S. PATENT DOCUMENTS

2013/0305937 A1\* 11/2013 Roberge ............. A01F 15/0705
100/40
2014/0165856 A1 6/2014 Varley \* cited by examiner

PRIOR ART

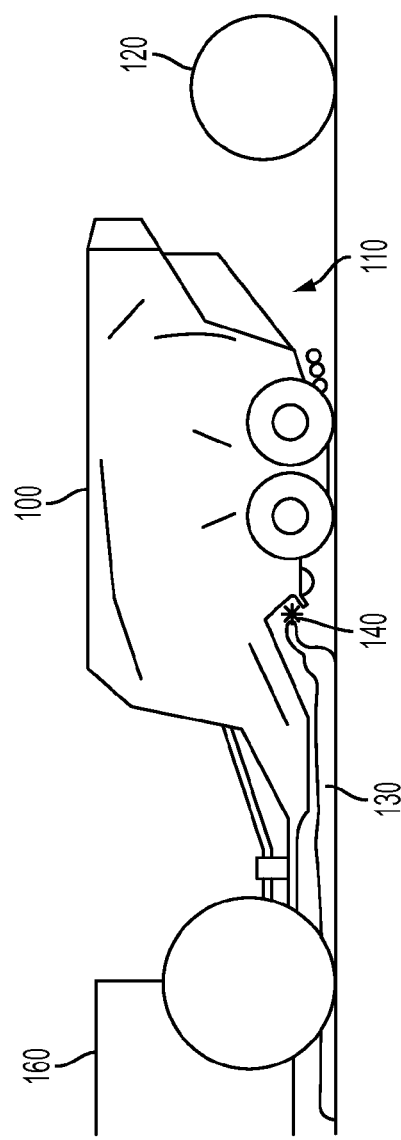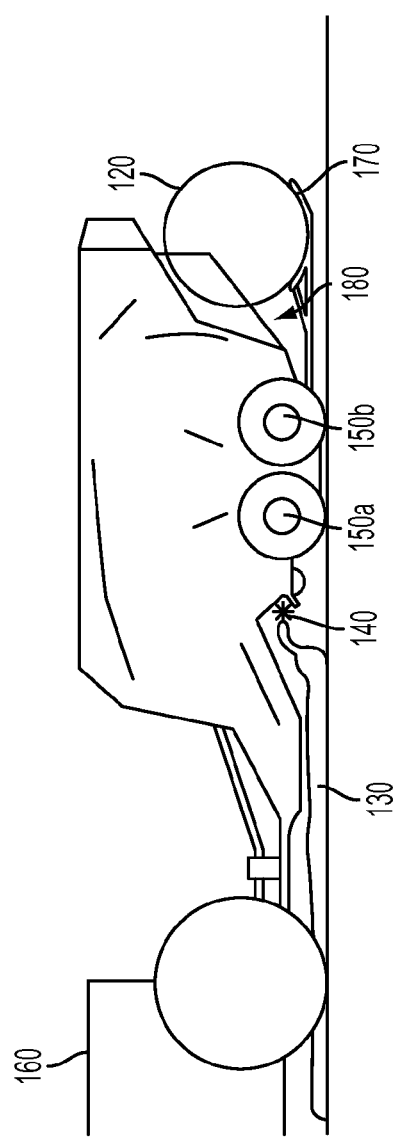

CONTINUOUS ROUND BALER WITH VARIABLE CONVEYOR

TECHNOLOGY FIELD

The present disclosure relates to a harvester and a system for the continuous baling of material, often for the baling of agricultural crop. The harvester and system comprise a harvesting assembly, a first and second bale chamber, and a conveyor system that transfers harvested material from a harvesting assembly to one of two bale chambers and that transfers a bale still in formation from a first bale chamber to a second bale chamber. The present disclosure relates to a harvester capable of simultaneous harvesting, bale growth, and bale ejection.

BACKGROUND

For many years agricultural balers have been used to consolidate and package crop material so as to facilitate the storage and handling of the crop material for later use. A mower-conditioner typically cuts and conditions the crop material for windrow drying in the sun. When the cut crop material is properly dried, an agricultural harvester, such as a round baler, operates over the windrows to pick up the crop material and form the crop material into cylindrically-shaped round bales. Other agricultural harvesters, such as those harvesters used for biomass collection, use direct feed mechanisms that cut, collect, and bale material into a round bale in sequential steps.

The pickup of the baler gathers the cut and windrowed crop material from the ground then conveys the cut crop material into a bale-forming chamber within the baler. A drive mechanism operates to activate the pickup, auger, and a rotor of the feed mechanism. A conventional baling chamber may consist of a pair of opposing sidewalls with a series of belts that rotate and compress the crop material into a cylindrical shape. When the bale has achieved a desired size and density, a wrapping system may wrap the bale to ensure that the bale maintains its shape and density. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

Conventional balers require a relatively long period of downtime, typically between 10 and 15 seconds, to open the tailgate of the baler and eject the wrapped bale. The downtime required reduces the overall efficiency of the harvesting system. Modified balers have been designed to allow for continuous harvesting, where crop can be harvested into a new bale, simultaneous with the wrapping and ejecting of a fully formed bale. EP 2 220 929 discloses a round baler with a bale chamber and a storage chamber. Bales are condensed and wrapped in the bale chamber, and a fully-formed bale may be stored in and eventually ejected from the storage chamber while harvesting continues to take place in the bale chamber. A harvesting assembly centrally located on the bottom of the harvester routes harvested crop to one of the two chambers. The harvesting assembly in conjunction with an internal series of rollers between the two chambers routes harvested crop through a curved passage that back-feeds the bale chamber on a single moveable roller. A limitation of this design is the multiple directions toward which the harvested crop must be fed from the harvesting assembly causing a greater likelihood of clogging the entry point of the bale chamber. The likelihood of clogging the passage with crop also increases with the work of the back-feed mechanism being completed by a single roller.

U.S. Pat. No. 6,729,118 discloses another modified baler for harvesting in which three movable arms in operable connection to movable rollers. The moveable arms rotate about the same axis in a windmill-like fashion within the interior of the baler. A pick-up assembly directs crop to only one bale chamber entry point and the windmill-like motion of the arms conveys a bale to a second position within the harvester immediately prior to ejection. This design allows for fewer rollers in the interior of the harvester which are necessary to transfer a partially formed bale to a second position while bale formation occurs near the bale chamber entry point. A potential problem with the design is the control of the independent movement of the arms which may increase operator error during operation. Another limitation of the design is the increased likelihood of silage pile-up and plugging of bale chamber due to a lack of sufficient tension around the bale chamber with a long belt and long belt pathway. This problem is likely exacerbated by the movable roller mechanically linked to a spring at the front end of the baler. Increased silage and harvested crop pile-up toward the front of the baler may contribute to the bale not forming properly while the baler is in operation due to the lack of tension on the bales caused by the movable roller and its related spring-loaded apparatus.

In some previous designs, for instance U.S. patent application Ser. No. 13/472,266, a conveyor between two bale chambers facilitated movement, however, this design relied solely upon gravity and the downward pitch of the conveyor to transfer a formed bale from one position to another position prior to its evacuation. The instantly disclosed design of the harvester increases the speed with which a harvester comprising a baling mechanism moves a bale from a bale chamber to a second position from which the bale will exit the harvester. Instead of relying solely on the passive nature of the angle of a bottom conveyor and gravity to transfer the bale, the current design includes a bottom conveyor with baling belts that assume a variable geometry during different stages of operations that coordinate faster, controlled movement of the baling belts from one position to a position immediately prior to exit or evacuation from the harvester. The instantly disclosed design also preserves the shape of the bale during transition from a first position to a second position by exacting tension on the bale at appropriate points of the bale during transfer. By correcting the shape of the bale, the instantly disclosed design improves bale density over prior designs during transition from a first position to a second position. Lastly, the design shortens the transfer time of the bale from the first bale chamber during transition.

SUMMARY

The present disclosure provides to a harvester comprising a pickup assembly and two bale chambers operably coupled by a conveyor system. One bale chamber is positioned in the front of the agricultural harvester while the second bale chamber is positioned in the rear of the agricultural harvester. Depending upon the mode of operation, either bale chamber or both bale chambers may be used for bale formation. The design also allows for continuous bale formation to greatly improve the efficiency of simultaneous crop harvesting, bale formation, and bale ejection. While a bale is fully forming in the rear of the baler in a second bale chamber, the first bale chamber can begin partially forming a second bale, this partially formed second bale being sometimes called a core. In some embodiments, a bale carrier is configured around the outlet of the first bale chamber to allow quick ejection of the bale from the first bale chamber and transfer to the second bale chamber. In some embodiments, two bale carriers are configured around the entry point and outlet, respectively, of the second bale chamber to allow clearance of the bale entering and exiting the second bale chamber. In some embodiments, a first bale chamber may be positioned forward of a second bale chamber, wherein the first and second bale chambers are operably coupled by a conveyor system.

The present disclosure provides to a continuous round baler comprising: a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler;

a crop harvesting assembly positioned in front of the baler and operably connected to the first bale chamber;

a first serpentine system arranged for the first bale chamber, the first serpentine system comprising:

a first bale carrier positioned at the outlet of the first bale chamber; and a plurality of baling belt rollers in operable contact with one or more baling belts, the plurality of baling belt rollers comprising two lower baling belt rollers movable in an up and downward direction independent of movement of any other baling belt rollers in the baler;

a second serpentine system arranged for the second bale chamber, the second serpentine system comprising:

a second bale carrier positioned at the entry point of the second bale chamber;

a third bale carrier positioned at the outlet of the second bale chamber; and a plurality of baling belt rollers in operable contact with one or more baling belts, the plurality of baling belt rollers comprising two belt rollers movable in the fore and aft directions and independent of movement of any other rollers in the baler; wherein the second and third bale carriers are in operable contact with the one or more baling belts.

The downward angle of the conveyor system allows for bale transfer between the first and second bale chambers to be achieved more easily by movement of the conveyor system combined with the downward force of gravity.

In some embodiments, the present disclosure provides to a continuous round baler comprising: a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler;

a crop harvesting assembly positioned in front of the baler and operably connected to the first bale chamber;

a first serpentine system arranged for the first bale chamber, the first serpentine system comprising:

a first bale carrier positioned at the outlet of the first bale chamber; and a plurality of baling belt rollers in operable contact with one or more baling belts, the plurality of baling belt rollers comprising two lower baling belt rollers movable in an up and downward direction independent of movement of any other baling belt rollers in the baler;

a second serpentine system arranged for the second bale chamber, the second serpentine system comprising:

a second bale carrier positioned at the entry point of the second bale chamber;

a third bale carrier positioned at the outlet of the second bale chamber; and a plurality of baling belt rollers in operable contact with one or more baling belts, the plurality of baling belt rollers comprising two belt rollers movable in the fore and aft directions and independent of movement of any other rollers in the baler; wherein the second and third bale carriers are in operable contact with the one or more baling belts; and wherein each of the first, second, and third bale carriers are movable in the upward and downward directions by a mechanical device operatively coupled to the first pair of arms and/or the second pair of arms of each of the first, second, and third bale carriers; and wherein the second bale carrier forms a front side of a bale in the second bale chamber in its fully closed position, wraps the fully formed bale while in transition to its closed position and receives a partially formed bales from the first bale chamber in an open position; and wherein the third bale forms a rear side of the bale in the second bale chamber in its fully closed position and facilitates evacuation of the bale in an open position.

In some embodiments, the first serpentine system comprises a first series of baling belt rollers, a second series of baling belt rollers, and a third series of baling belt rollers; wherein the first series of baling belt rollers comprises at least two baling belt rollers positioned above the first bale chamber within a plane transverse to the middle region of first bale chamber; wherein the second series of baling belt rollers comprises at least three upper baling belt rollers positioned upward and frontward from the center of the first bale chamber and each aligned at the same height along the top of the baler and the two lower baling belt rollers positioned at their highest position below the three upper baling belt rollers; and wherein the third series of baling belt rollers comprises at least two baling belt rollers positioned frontward of the first bale chamber and at a height above the floor roller and under the first series and second series of baling belt rollers; and wherein the second serpentine system comprises a fourth series and a fifth series of baling belt rollers, the fourth series of baling belt rollers positioned above the second bale chamber within a plane transverse to the second bale chamber's approximate center; and the fifth series of baling belt rollers comprising the three fixed baling belt rollers aligned vertically and frontward from the second bale chamber and the two baling belt rollers movable in the fore and aft directions.

In some embodiments, the first, second, and third bale carriers are movable among a closed position and one or more open positions, each bale carrier comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel bars affixed to the one or more fixed members.

In some embodiments, the plurality of baling belt rollers comprises two lower baling belt rollers fixed at each end to a pair of parallel movable members, the two lower baling belt rollers movable in an upward and downward direction about a pivot point determined by the rearward end of the pair of parallel members and independent of movement of any other rollers in the baler.

In some embodiments, the conveyor system, which facilitates movement of a bale (or bale core) between the first and second bale chambers and is positioned at a downward angle between the first and second bale chambers, comprises at least two rollers and a conveyor belt positioned over the at least two rollers wherein rotation of the at least two rollers causes the conveyor belt to carry harvested crop from the crop harvesting assembly to the second bale chamber. In some embodiments, the conveyor system comprises at least three, four, or more rollers positioned at a downward angle between the first and second bale chambers. In some embodiments, the conveyor system comprises one or more conveyor belts that carry harvested crop from the crop harvesting assembly or first bale chamber to the second bale chamber.

In some embodiments, the first and second bale chambers are defined in a space between the first sidewall, the second sidewall, the bale carrier, and a plurality of rollers positioned between and attached to the first and second sidewalls; wherein the plurality of rollers support one or more baling belts and comprise at least one floor roller.

In some embodiments, the baler comprises a first sensor positioned in the first bale chamber and a second sensor positioned in the second bale chamber, wherein the first and second sensors are in operable communication with a controller system and detect the diameter of a bale in the first and second bale chambers.

In some embodiments, the baler of the present disclosure further comprises at least a first and second operable condition, wherein the first operable condition comprises the first bale carrier in a fully closed position, the second bale carrier in a fully close position, and the third bale carrier in a fully raised position, wherein the fully raised position of the third bale carrier allows evacuation of a bale from the baler; the second operable condition comprises the first bale carrier and the second bale carrier in a fully raised position, and the third bale carrier in a fully closed position, wherein the first and second fully raised positions allows for transfer of a bale from the first bale chamber to the second bale chamber; wherein the first baler carrier in a fully raised position allows for crop to be transferred from a crop harvesting assembly through the first bale chamber and into the second bale chamber where the crop accumulates into a bale of a predetermined size.

In some embodiments, the baler of the present disclosure further comprises a motor and at least one of the following: an electronic actuator, a hydraulic cylinder, or a tensioning actuator operatively coupled to the first pair of arms and/or the second pair of arms at least one bale carrier, wherein the at least one electronic actuator, a hydraulic cylinder, or a tensioning actuator facilitate the upward or downward movement of the at least one bale carrier.

In some embodiments, the baler comprises a net wrapping mechanism in the second bale chamber optionally positioned under the third bale carrier to the rear of the second bale chamber or above the second bale carrier in the front of the second bale chamber. In some embodiments, the baler comprises a net wrapping mechanism in the second bale chamber optionally positioned under the third bale carrier to the rear of the second bale chamber, above the second bale carrier in the front of the second bale chamber, or affixed to the second bale carrier; wherein, if the net wrapping mechanism is above the second bale carrier or under the third bale carrier to the rear of the second bale chamber, the net wrapping mechanism is independently controlled and operated by one or more controllers. In some embodiments, the net wrap system can also be attached to the front of second bale carrier.

In some embodiments, the second bale chamber comprises at least one floor roller movable in the upward or aft direction that functions as a bale kicker when the third bale carrier is raised in a fully open position, wherein the at least one floor roller is in operable communication to a controller system.

In some embodiments, the conveyor system comprises at least four rollers around which one or more conveyor belts rotate, wherein the rollers exact tension on the conveyor belt and convey crop between the first and the second bale chambers.

In some embodiments, the disclosure relates to a crop collection system for use in an agricultural harvester comprising: a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler; a crop harvesting assembly positioned in the front of the baler and in operable connection to the first bale chamber; and at least one bale carrier, each bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel bars affixed to the one or more fixed members.

In some embodiments, the disclosure relates to a crop collection system for use in an agricultural harvester, such as a round baler, comprising: a first bale chamber and a second bale chamber operably coupled by a conveyor system; wherein the first bale chamber is positioned at a front of the baler and the second bale chamber is positioned at a rear of the baler, wherein each of the first and second bale chambers comprise a first sidewall and a second sidewall, an entry point at the front of the first and second bale chambers, an outlet at a rear of the first and second bale chambers, and at least one floor roller positioned at a bottom of each of the bale chambers transverse to the first and second sidewalls; wherein the conveyor system is positioned between the first and second bale chambers at a downward angle from the front of the baler to the rear of the baler; a crop harvesting assembly positioned in the front of the baler and in operable connection to the first bale chamber; and at least one bale carrier, each bale carrier movable among a closed position and one or more open positions, comprising: a first pair of arms extending transversely from and affixed to a first pair of pivot points on the first and second sidewalls; a second pair of arms extending transversely from and affixed to a second pair of pivot points on the first and second sidewalls; one or more fixed members positioned at a distance defined by the length of the first and second pair of arms; and a pair of parallel bars affixed to the one or more fixed members; wherein the second bale chamber comprises at least one floor roller attached to a spring that assert move force to the bale when the bale is ejected from the second bale chamber. In some embodiment, the crop collection system comprises a second bale chamber with two or more, three or more, or four or more floor rollers. In some embodiments, each of the two or more, three or more, or four or more floor rollers are in operable connection to at least one spring, wherein each roller exerts a force on the bale exiting the second bale chamber to increase the speed of the bale as it exists the second bale chamber. In some embodiments the spring on the at least one floor roller is compressed and released in coordination with a hydraulic cylinder and actuator in operably linked to the second bale carrier so that extension of the hydraulic cylinder occurs contemporaneously with the sequential compression and release of the spring or springs. The at least one floor roller, at least two floor rollers, at least three floor rollers act as bale kickers to facilitate the ejection of the bale from the second bale chamber upon upward movement of the second bale carrier from its fully closed position.

In some embodiments, the crop collection system further comprises a fixed member positioned above the at least one bale carrier for feeding or retracting a flexible material attached along a face of the at least one bale carrier distal to the fixed member. In some embodiments, the fixed member comprises a spring-loaded roller for feeding or retracting the flexible material. In some embodiments the flexible material is used for a safety barrier between the third bale carrier and the area outside the agricultural harvester comprising the bale forming or ejection system or the baler. In some embodiments, the fixed member is operably coupled to at least one motor for facilitating the feeding or retraction of the flexible material. In some embodiments of the disclosure, the flexible material is a tarp, woven textile, synthetic fiber, or rubber flap which provides a physical barrier between the operating bale chambers and the environment rear to the crop collection system. The physical barrier prevents harvested crop or other materials in the second bale chamber from being ejected out of the crop collection system and prevents individuals or other objects from entering the second bale chamber.

In some embodiments, the agricultural harvester is one of: a round baler, a cotton harvester, a waste baler, and a combine.

In some embodiments the one or more fixed members of the at least one bale carrier comprise at least a first roller; wherein the pair of parallel bars are affixed to each end of the first roller on a set of rotatable axes. In some embodiments, the one or more fixed members of the at least one bale carrier comprises at least a first roller and a second roller; wherein the pair of parallel bars are affixed to each end of the first roller and the second rollers on a set of rotatable axes. In some embodiments, the first pair of arms and/or the second pair of arms of the at least one bale carrier is operably coupled to a hydraulic system for facilitating upward movement of the first pair of arms and/or the second pair of arms around the first and second pair of pivot points. In some embodiments, the first pair of arms and/or the second pair of arms of the at least one bale carrier is operably coupled to an electronic system for facilitating upward movement of the first pair of arms and/or the second pair of arms around the first and second pair of pivot points. In some embodiments the one or more fixed members of the at least one bale carrier comprise at least a first roller, a second roller, a third roller; wherein the pair of parallel bars is affixed to each end of the first roller, the second roller, and the third roller on a set of rotatable axes; and wherein the at least one bale carrier comprises a fourth roller positioned transverse to the first and second side walls and above the first roller and proximate to the top of the first and second sidewalls. In some embodiments, the fourth roller establishes enough tension in the baling belts to assure that the baling belts do not physically contact one another in upon upward movement of the first, second, or third bale carriers from their respective fully closed positions or in their respective fully opened positions.

In some embodiments, the crop collection system further comprises: one or more baling belts to convey rotation of a bale in the bale chamber in contact with the fourth roller positioned above of the first, second or third rollers of at least one bale carrier, wherein the fourth roller imparts tension to the one or more baling belts; wherein the first roller of the at least one bale carrier takes up slack in the one or more baling belts when the at least one bale carrier pivots upward at any angle from its closed position and provides slack in the one or more baling belts when the at least one bale carrier pivots downward from an open position; wherein the second roller of the at least one bale carrier deflects contact between the bale and the one or more baling belts; and wherein the third roller of the at least one bale carrier conveys tension to the one or more baling belts whereby it positions the one or more baling belts in operable contact with the bale when the at least one bale carrier is in its closed position.

In some embodiments, the crop collection system comprises three bale carriers, each bale carrier comprising: one or more baling belts to convey rotation of a bale in the bale chamber in contact with a roller positioned above the at least one bale carrier that imparts tension to the one or more baling belts; wherein the first roller of the at least one bale carrier takes up slack in the one or more baling belts when the retractable bale carrier pivots upward at any angle from its closed position and provides slack in the one or more baling belts when the at least one bale carrier pivots downward from an open position; wherein the second roller of the at least one bale carrier deflects contact between the bale and the one or more baling belts; and wherein the third roller of the at least one bale carrier conveys tension to the one or more baling belts whereby it positions the one or more baling belts in operable contact with the bale when the at least one bale carrier is in its closed position.

In some embodiments the present disclosure relates to a method of harvesting crop into a crop collection system, said method comprising: (a) feeding crop from a crop harvesting assembly into the first bale chamber; (b) forming a partially formed bale in the first bale chamber to a desired size and/or density; (c) transferring the partially formed bale from the first bale chamber to the second bale chamber on the conveyor system; (d) completing bale formation in the second bale chamber; and (e) ejecting the completed bale from the second bale chamber contemporaneously with initiating step (a).

BRIEF DESCRIPTION OF THE DRAWINGS

FIGS. 2A and 2B depict two exemplary embodiments of the continuous round baler.

DETAILED DESCRIPTION

Figure 1:
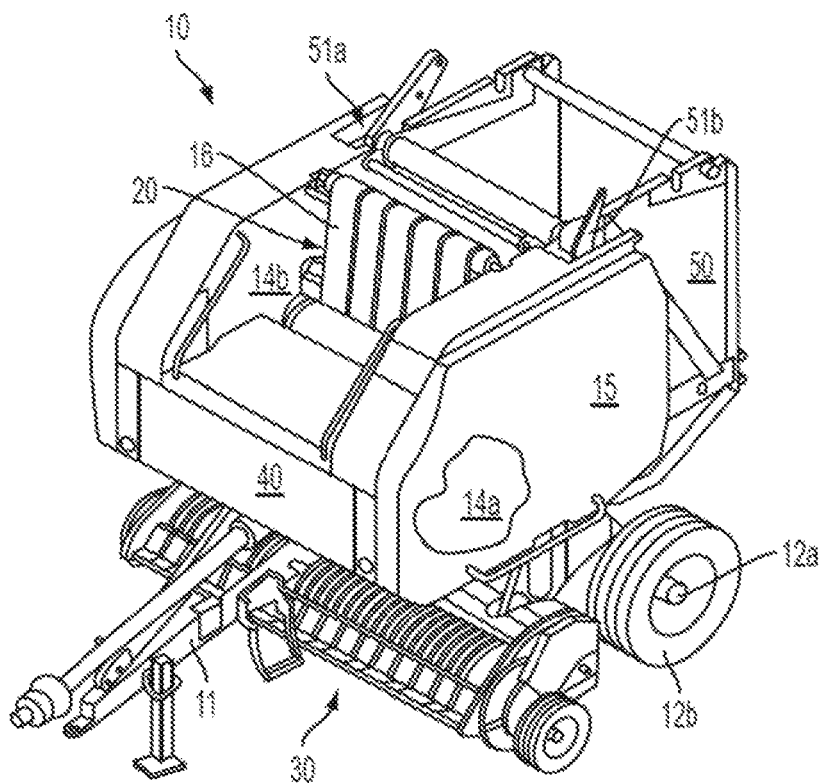
FIG. 1 depicts a static image of a traditional baler.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "harvester" as used herein is defined as a machine designed to consolidate and package material so as to facilitate the storage and handling of the material for later use. In some embodiments, the harvester is used to harvest agricultural material. In some embodiments, the harvester is known as an agricultural baler, a waste baler, or a combine.

The term "material" as used herein is defined as a numerous individual items that are harvested or collected by the harvester. In some embodiments, the material is agricultural crop, such as hay or cotton. In some embodiments, the material is biomass.

The term "harvesting assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683 A1 that illustrates such mechanisms, the disclosures of which are incorporated herein by reference in their entirety.

The term "bale chamber" as used herein is defined as any space within the harvester that forms a bale of harvested material. In some embodiments, the sides of the bale chamber are defined by opposite side walls and the bottom of the bale chamber is defined by at least one floor roller that spans transverse to the sidewalls and that partially supports the weight of the bale in the bale chamber. In some embodiments, the bale chamber is also defined in its front region by an entry point through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale.

The term "bale carrier" is defined as a retractable mechanism that obstructs an entry or outlet of a bale chamber when the bale carrier is in its fully closed position. In some embodiments, the bale carrier is connected to at least one movable roller that obstructs an entry or outlet of a bale chamber. In some embodiments, the bale carrier is controlled by an operator, who through a controller, uncovers the entry or outlet points of the bale chamber when the bale is of a desired width, height and/or density. Bale carriers are described in U.S. patent application Ser. No. 13/308,304, currently pending, which is incorporated herein by reference in its entirety. Controllers are generally known in the art and any controller for the agricultural harvester can be used independent of or in conjunction with a tractor controller. Examples of controllers are described in U.S. Pat. No. 7,640,721, which is incorporated herein by reference in its entirety. In some embodiments, the bale carrier movable among a closed position and one or more open positions, wherein the bale carrier uncovers the outlet at one end of the bale chamber through which the bale becomes ejected from the bale chamber when the bale carrier is raised upward from its closed position. It is understood that, in some embodiments, a first or second serpentine system comprises the bale carrier and the rollers that are contained within each bale carrier.

In some embodiments, the harvester or system comprises one or a plurality of bale carriers with at least two pairs of arms that pivot upward and downwards with at least two different pivot points. In some embodiments, the two pivot points rest on two different axes of rotation. If embodiments comprise bale carriers with at least two pairs of arms, in some embodiments, the length of one pair of arms is shorter than the other, and in such cases, upon opening or closing of the bale carrier, the rate of speed of one pair of arms must be faster than the rate of speed of the other pair of arms, such that the shorter pair of arms does not interfere with the radial path of the longer pair of arms. If embodiments comprise bale carriers with at least two pairs of arms, in some embodiments, the length of one pair of arms is shorter than the other, and in such cases, upon opening or closing of the bale carrier, the rate of speed of one pair of arms must be faster than the rate of speed of the other pair of arms, such that no cross-over of the first or second pair of arms occurs upon movement of the bale carrier along its radial path.

In some embodiments, the harvester comprises at least one, two, or three bale carriers, wherein the at least the first, second, or third bale carriers comprises an arm assembly comprising at least one pair of arms with a length that defines a radial path about a pivot point around an axis of rotation of such bale carrier. In some embodiments, the arm assembly of such bale carriers comprise a linkage to one or more pivot points on the sidewall of the harvester or system such that the arm assembly rotates about the pivot point. In some embodiments, the harvester or system comprises at least two arm assemblies with linkages to two different pivot points around which the bale carriers rotatably pivot. As disclosed herein, if the bale carrier comprises at least two arm assemblies with at least two pivot points, the arm assemblies may be two different lengths. Upon initiating movement or any opening or closing disclosed herein, the shorter length of one arm assembly will move faster than the longer arm assembly such that the two arm assemblies do not cross radial paths as the bale carrier moves from one position to another position.

The term "serpentine system" as used herein is defined as one or a plurality of baling belts and a plurality of rollers, such rollers responsible for directing the path and exacting tension upon one or a plurality of baling belts, wherein the one or plurality of baling belts capable of forming bale in a bale chamber during the operation of the harvester. In some embodiments, the one or a plurality of baling belts rotate endlessly on the plurality of rollers.

The term "movable point of contact" is defined as a point of contact between one or a plurality of bailing belts and a leading edge of a bale.

The term "controller" as used herein is defined as a device that is operably connected to and commands another item, element, device, mechanism, or assembly and optionally provides information on the position, condition, or state of the commanded item, element, device, mechanism or assembly. In some embodiments, the controller is operably connected to a net wrapping mechanism. In some embodiments, the controller is operably connected to a net wrapping mechanism by at least one or a combination of a manual lever, and electrical component, and a hydraulic actuator. In some embodiments, the controller is able to control the position of the net wrapping mechanism. In some embodiments, the controller is in electronic communication with at least one sensor that provides feedback as to the position of the net wrapping mechanism within the subframe. In some embodiments, the controller provides warning signals to an operator if sensors in electronic communication with the controller identify that a position along the path of a bale is occluded or blocking the path of the bale. In some embodiments, the controller provides warning signals to an operator if sensors in electronic communication with the controller identify that one or more bale carriers is not in a position that is synchronous with another bale carrier or separate system such that the bale carrier cannot facilitate the transfer of a bale from one position to a second position. In some embodiments, the controller is located on the side of a harvester.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural balers, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present disclosure are particularly well suited, but in no way limited to, use with agricultural balers. The present disclosure may also find utility in agricultural harvesters including, for example, a waste baler, a cotton harvester, or a combine. In some embodiments, the present disclosure is related to embodiments disclosed in U.S. patent application Ser. Nos. 14/316,121, titled "REMOVABLE AND MOBILE NET WRAP SYSTEM" and 14/316,209, titled "CONTINUOUS HARVESTER AND MOBILE WRAPPING SYSTEMS AND METHODS OF USING THE SAME", filed together with the current disclosure on Jun. 26, 2014, which are incorporated herein by reference in their entirety.

The present disclosure relates to a harvester comprising: a first bale chamber and a second bale chamber operably coupled by a conveyor system; wherein the first bale chamber is positioned at one end of the baler and the second bale chamber is positioned at the opposite end of the baler; wherein each of the first and second bale chambers comprise a first sidewall and a second sidewall, an entry point at one end of the first and second bale chambers, an outlet at the opposite end of the first and second bale chambers, and at least one floor roller positioned at the bottom of each of the bale chambers transverse to the first and second sidewalls; wherein the conveyor system is positioned between the first and second bale chambers and comprises one or a plurality of endless belts extending around and supported by at least one stationary roller and at least a first movable roller; wherein the at least one stationary roller and the at least first movable roller are positioned transverse to the first and second sidewalls and spin about a rotational axis; and wherein the rotational axis of the at least first moveable roller is capable of movement in one or more operable positions independent of the rotational axis of the at least one stationary roller such that the position of the at least first movable roller creates more than two points of inflection in the one or plurality of endless belts.

In some embodiments, when a bale is growing in at least one bale chamber and no crop material is being transferred to a second position from the at least one bale chamber, the one or more bale gates in the conveyor system are in a stationary position and one or more movable rolls in the conveyor system are in a stationary position exacting a steady or substantially steady tension of the one or plurality of endless belts in the conveyor system. Upon initiation of movement of the one or plurality of bale carriers from a stationary position to one or more open positions, the movable rolls of the conveyor system may move to maintain a steady or substantially steady tension of the one or plurality of endless belts in the conveyor such that the shape of the endless belts around the conveyor system define a geometry that is different than the geometry in its original stationary position of the conveyor system. In some embodiments, the first and second serpentine systems and the conveyor system possess variable geometries at one or a plurality of different positions during operation and/or transfer of the bale from one position to a second position within or out of the harvester.

Referring to FIG. 1, a generally well-known round baler 10 is shown to include a main frame terminating forwardly in a tongue 11 and rearward slightly beyond a transverse axle 12a to which a pair of wheels 12b (only one shown) is mounted, thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed into bale-forming chamber 20 where it is formed into a cylindrically shaped ball (not shown) by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground. For clarity and purposes of the instant disclosure, the tailgate 50 and hydraulic mechanism that controls the upward swing of the tailgate are replaced by the crop collection system (also referred to as a bale collection and ejection system) comprising the serpentine system depicted in FIGS. 3-9, wherein at least one bale carrier comprises or are in operable contact with two hydraulic tensioning actuators on opposite sides of the sidewalls. In some embodiments of the present disclosure, a pair of hydraulic tensioning actuators are positioned between the outside of the sidewalls and under the main frame of the baler. In some embodiments, the tensioning actuators are electrically powered and are positioned on opposite sides of the sidewalls. In some embodiments of the present disclosure, tensioning actuators are positioned on the outside of the sidewalls and attached to the main frame of the baler. In some embodiments, the tensioning actuators are electrically powered and on opposite sides of the sidewalls.

FIGS. 2A and 2B depict exemplary side external perspectives of embodiments of the claimed disclosure, each embodiment depicting a continuous round baler with a mainframe being towed by a tractor 160. Cut crop material 130 is picked up by the transverse pickup 140 positioned forward from two axles (not pictured) that support the wheels 150a, 150b of the baler. FIG. 2A depicts a cylindrically shaped bale 120, which is formed within in the two bale chambers (not shown), and optionally wrapped in net wrapping or twine deposited from a device in operable contact with the second bale chamber. The cylindrically shaped bale 120 is ejected without a bale ramp through a bale chamber outlet 110 positioned at the rear of the baler 100. The bale 120 rests directly on the ground after ejection. FIG. 2B depicts a similarly shaped bale 120 being ejected from the bale chamber outlet positioned at the rear of the continuous round baler 180 onto a bale ramp 170. In some embodiments, the bale ramp 170 provides balance to the continuous round baler so that ejection of the bale can be accomplished on a hill or field with a slight incline. In some embodiments, the continuous round baler does not comprise a tailgate that operates on a single hinge. In some embodiments, the continuous round baler does not comprise a bale ramp. In some embodiments, at least a first set of two hydraulic or electronic tensioning actuators positioned on the outside of the opposite sidewalls (and under the mainframe) raise and lower a first bale carrier positioned over the outlet of the first bale chamber. In some embodiments, a second set of two hydraulic or electronic tensioning actuators positioned on the outside of the opposite sidewalls (and under the mainframe) raise and lower a second bale carrier positioned over the inlet of the second bale chamber. In some embodiments, a third set of two hydraulic or electronic tensioning actuators positioned on the outside of the opposite sidewalls and under the mainframe raise and lower a third bale carrier positioned over the outlet of the second bale chamber. In some embodiments, at least a first set of two hydraulic or electronic tensioning actuators positioned on the side of the opposite sidewalls and under the mainframe raise and lower a first, second, and/or third bale carrier positioned over the inlet or outlet of the first or second bale chamber.

FIGS. 3-9 depict the function of the components of an exemplary cross-sectional side-view of a continuous round baler during operation. It is understood that the components of the continuous round baler may function in a serial, stepwise or simultaneous fashion but that all steps described in FIGS. 3, 4, 5, 6, 7, 8, and 9 illustrate one embodiment of a single cycle of continuous baling for purposes of the disclosure.

Figure 3:
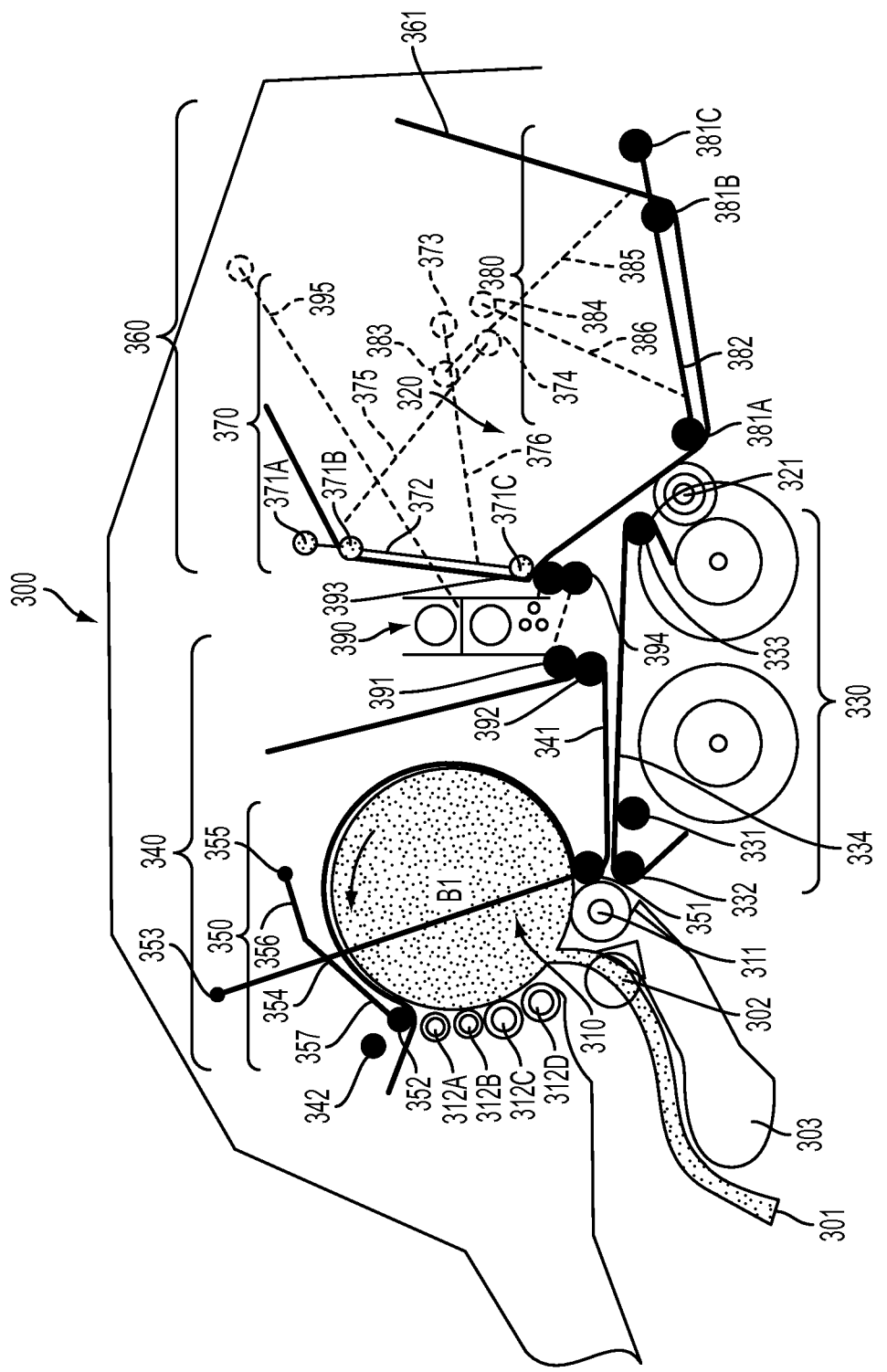
FIGS. 3-9 depicts the continuous round baler, with a harvesting assembly, two bale chambers, three bale carriers contained within two serpentine systems, and a conveyor system, in various stages of operation.

FIG. 3 depicts the continuous round baler generally designated 300, comprising a first bale chamber 310, a second bale chamber 320, and a conveyor system 330. The baler 300 also comprises a first serpentine system 340 that comprises a first bale carrier 350; a second serpentine system 360 that comprises a second bale carrier 370 and a third bale carrier 380; and a net wrap system 390. In the depicted embodiment of FIG. 3, the continuous round baler 300 is at the beginning on a first operational cycle. Crop in the field is usually arranged in a windrow as it is engaged by the baler being pulled along the windrow by a tractor (not shown). Crop 301 is conveyed into a first bale chamber 310 through an inlet point 302 fed by the transverse pickup 303 (or, optionally, a rotary cutter) and rolled into a cylindrical bale B1. In the illustrated embodiment, the bale may rotate between a first sidewall and second sidewall (not shown) such that the top material moves frontward and downward (movement depicted by arrow), with respect to the baler 300. In some embodiments, the sidewalls contain slots positioned to allow movement of the movable rollers disclosed in this application. The first bale chamber 310 is defined in part by a front floor roller 311, four front chamber rollers 312a, 312b, 312c, and 312d, and the first serpentine system 340 containing one or a plurality of endless belts 341, a fixed front roller 342, and a first bale carrier 350. In the illustrated embodiment, the first bale carrier is in a fully closed position, and comprises a primary roller 351 connected to a first pivot point 353 by a first pair of arms 354 and a kick roller 352 connected to a second pivot point 355 by a fixed pair of arms 356 and an extendable pair of arms 357. In some embodiments, the extendable pair of arms 357 comprises a hydraulic cylinder and a movable beam that can move the kick roller 352 to a rearward position upon engagement of the first bale carrier to its fully open position. Taken together, the elements of the first bale chamber 310 position the bale B1 at a first frontward position within the baler 300 for bale growth.

In the depicted embodiment of FIG. 3, there are components of the baler 300 that are not in direct contact with the bale B1, but are nevertheless important to the operational cycle. In the illustrated embodiment, the conveyor system 330 is in a maximally forward position, and comprises a first movable roller 331 in a maximally forward position, a second movable roller 332 in a downward position, a fixed roll 333, and one or a plurality of endless belts 334. In this position, the conveyor system 330 allows room for the first bale carrier 350 in a closed position, as well as optionally the net wrap system 390 in a downward position. In the illustrated embodiment, the second bale chamber 320 is defined in part by a rear floor roller 321, and the second serpentine system 360 containing one or a plurality of endless belts 361, a second bale carrier 370 and a third bale carrier 380. In the illustrated embodiment, the second bale carrier 370 is in an optional fully closed position, and comprises three carrier rollers 371a, 371b, and 371c, connected to each other by a connecting rod 372, and connected to a first and a second pivot point 373 and 374, by a first and second pair of arms 375 and 376. In the illustrated embodiment, the third bale carrier 380 is in an optional fully closed position, and comprises three carrier rollers 381a, 381b, and 381c, connected to each other by a connecting rob 382, and connected to a first and a second pivot point 383 and 384, by a first and a second pair of arms 385 and 386. In the illustrated embodiment, the net wrap system 390 is in an optional downward position, and is supported by two forward net rollers 391 and 392, two rearward net rollers 393 and 394, and a supporting arm 395. In some embodiments, the two forward net rollers 391 and 392 serve to control the path of the one or a plurality of endless belts 341 of the first serpentine system 340, such that there is no interference between the net wrap system 390, the one or a plurality of endless belts 341, and the bale B1. In some embodiments, the two rearward net rollers 393 and 394 serve to control the path of the one or a plurality of endless belts 361 of the second serpentine system 360, such that there is no interference between the net wrap system 390 and the one or a plurality of endless belts 361. In some embodiments, the rearward net roller 394 serves to apply pressure to the bale B1, such that wrapping material can be properly applied to the bale B1. In some embodiments, the conveyor system 330, the second bale carrier 370, the third bale carrier 380, and the net wrap system 390, may independently be in other optional positions.

Figure 4:
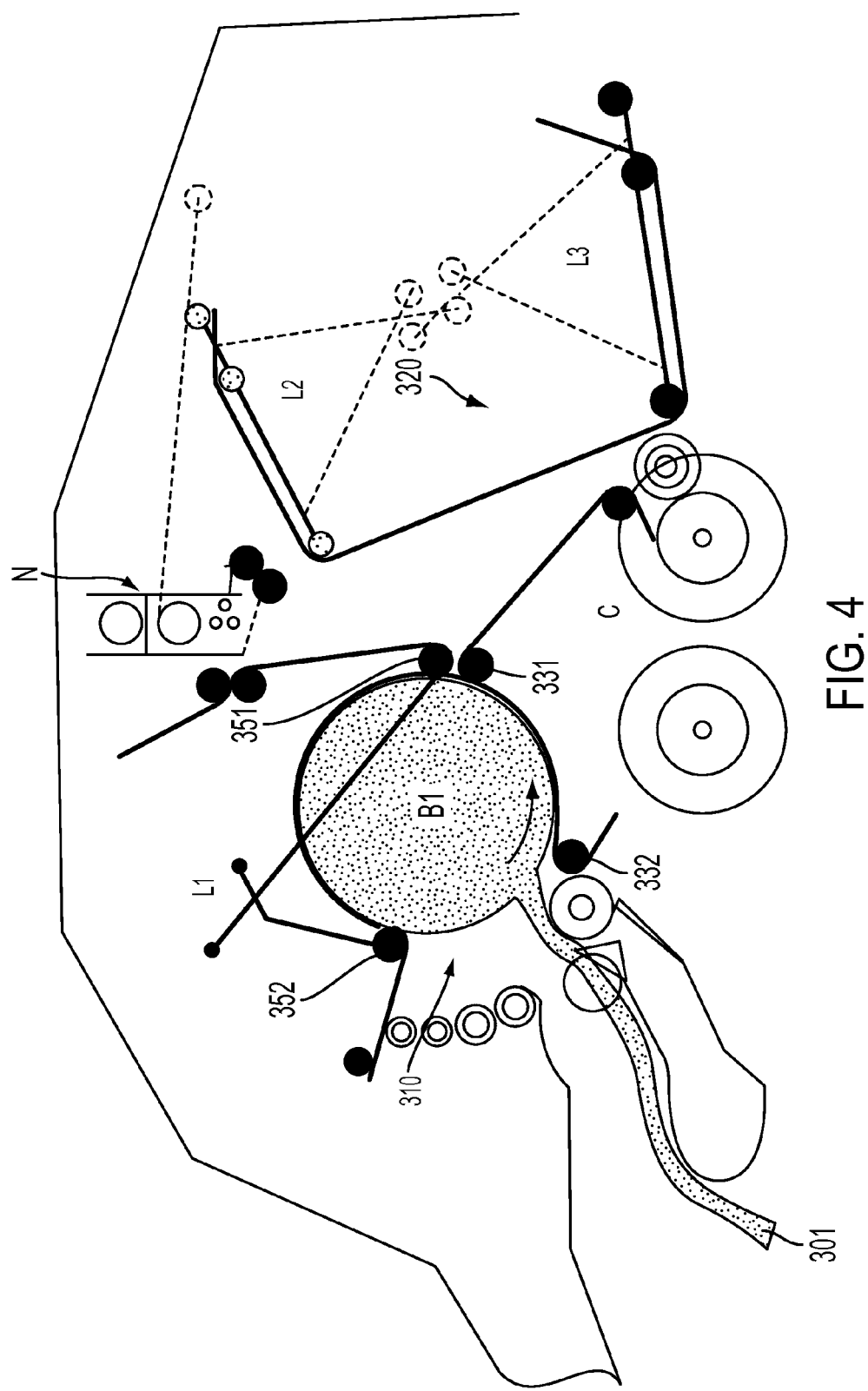

FIG. 4 depicts the series of events that occur sequentially or simultaneously after the steps in FIG. 3 have occurred. In FIG. 4, the crop 301 has continued to be fed into the first bale chamber 310 to produce a bale B1 that is now between about 50% to 60% of its maximum size. To being the transfer of the bale B1 from the first to the second bale chamber, the first bale carrier L1 begins to move to an open position. The primary roller 351 moves rearward and upward in comparison to its starting position, while the kick roller 352 begins to move downward and rearward. In the illustrated embodiment, the conveyor system C begins to move to a rearward position. The first movable roller 331 moves upward and rearward, while the second movable roller 332 moves upward. As a result of the movement of the first bale carrier L1 and the conveyor system C, the bale B1 begins to move rearward toward the second bale chamber 320. In the illustrated embodiment, the second bale carrier L2 is in a fully open position; the third bale carrier L3 is in a fully closed position; and the net wrap system N is in a upward position, is order to allow room for the bale B1 to move into the second bale chamber 320.

Figure 5:
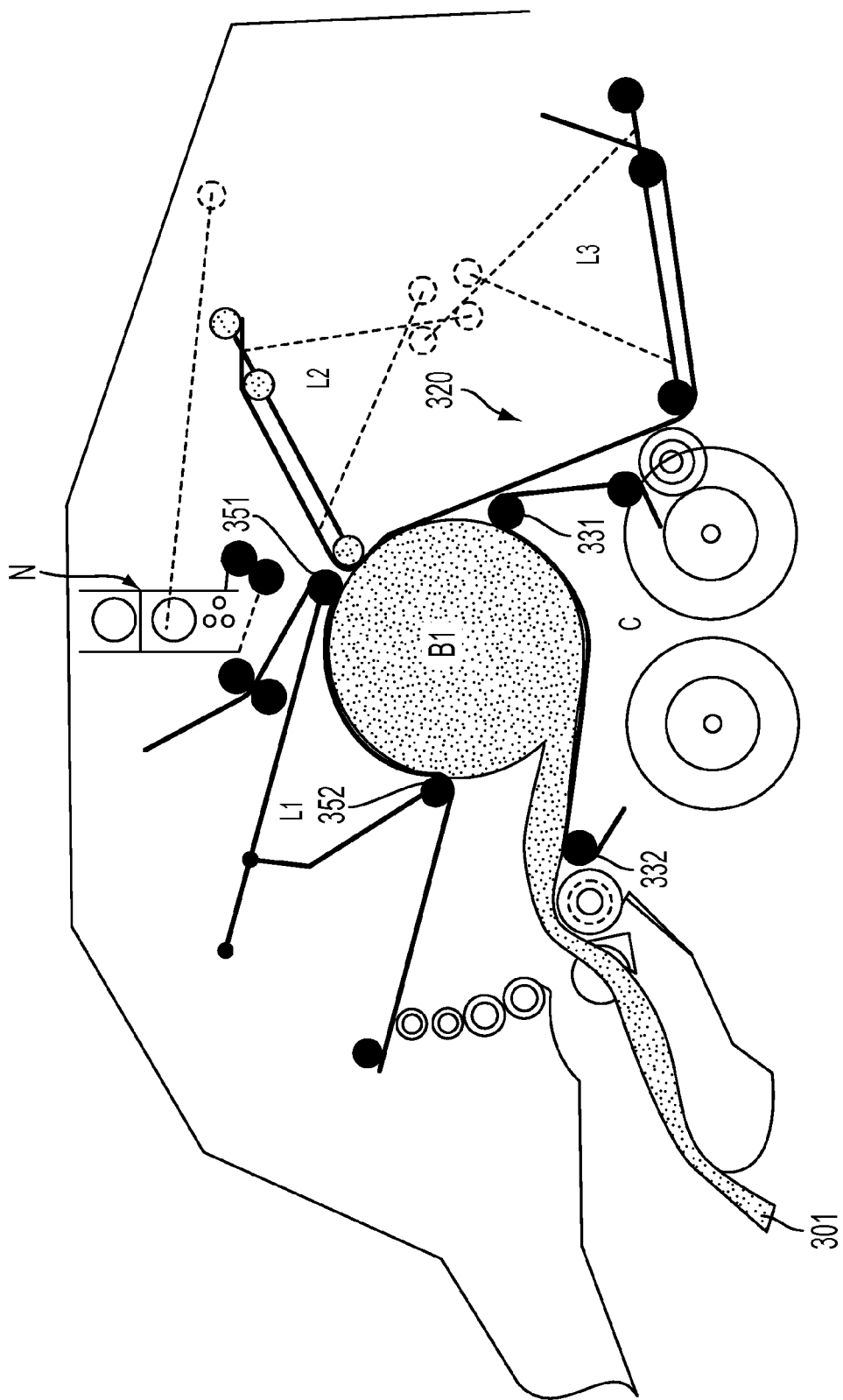

FIG. 5 depicts the series of events that occur sequentially or simultaneously after the steps in FIG. 4 have occurred. In FIG. 5, the crop 301 continues to be fed to the bale B1 by the conveyor system C during the bale transfer. In the illustrated embodiment, the first bale carrier L1 continues to move toward an open position, with the primary roller 351 still moving rearward and upward, and the kick roller 352 still moving rearward and downward. The conveyor system C continues to move toward a rearward position, with the first movable roller 331 in a rearward position in relation to its position in FIG. 4, while the position of the second movable roller 332 remains unchanged. As a result of the continued movement of the first bale carrier L1 and the conveyor system C, the bale B1 continues to move rearward toward the second bale chamber 320. In the illustrated embodiment, the position of the second bale carrier L2, the third bale carrier L3, and the net wrap system N remain unchanged from FIG. 4. In some embodiments, the bale B1 comes in operational contact with the one or plurality of belts of the second bale serpentine system as it is pushed rearward toward the second bale chamber 320.

Figure 6:
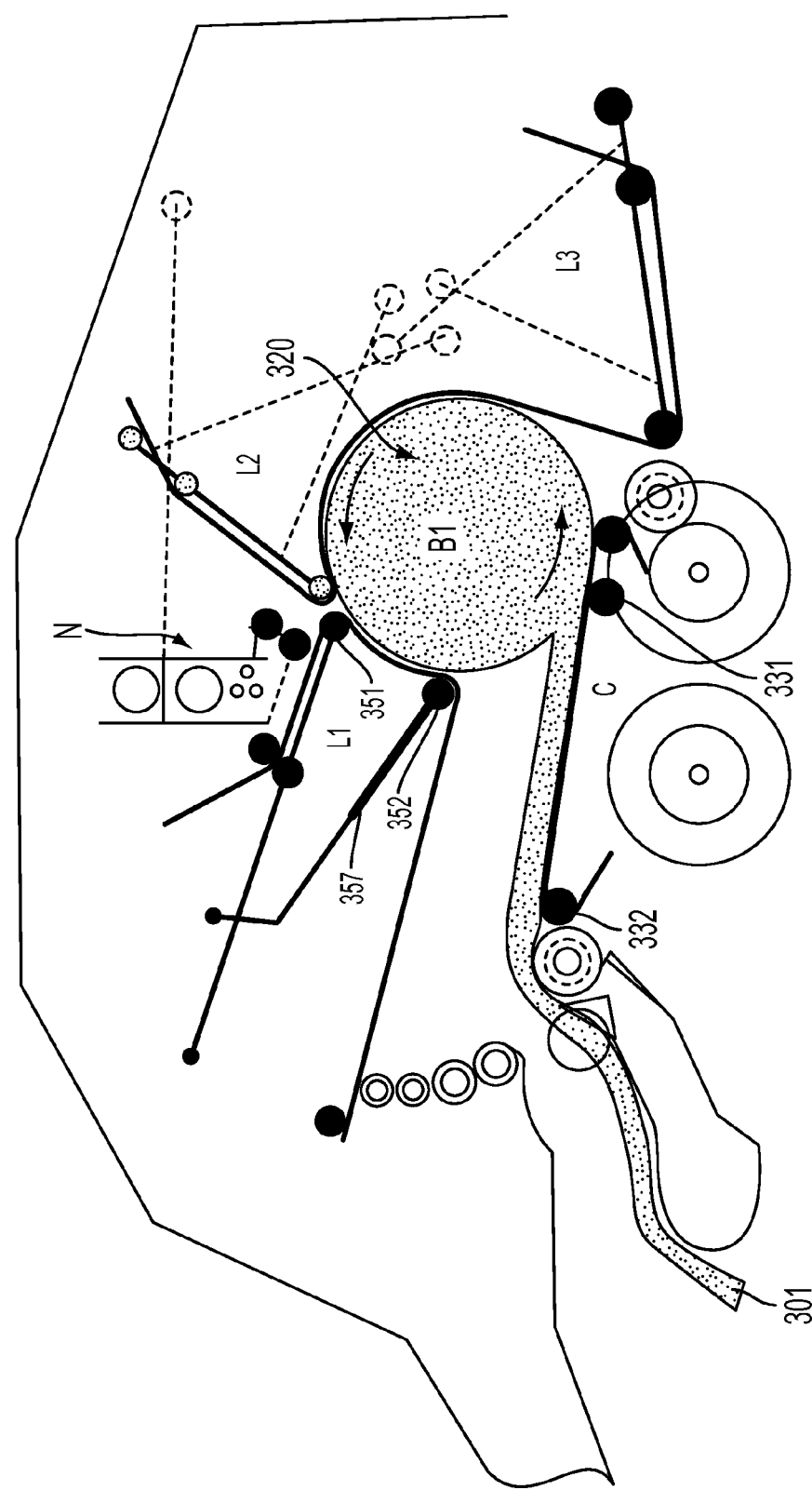

FIG. 6 depicts the series of events that occur sequentially or simultaneously after the steps in FIG. 5 have occurred. In FIG. 6, the crop 301 continues to be fed to the bale B1 by the conveyor system C during the bale transfer. In the illustrated embodiment, the first bale carrier L1 is in a fully open position, with the primary roller 351 in a maximally rearward and upward position. The kick roller 352 is pushed rearward by the extendable pair of arms 357, such that the roller pushes the bale B1 into the second bale chamber 320. The conveyor system C is in a fully rearward position, with the first movable roller 331 in a rearward and downward position in relation to its position in FIG. 5, while the position of the second movable roller 332 remains unchanged. As a result of the continued movement of the first bale carrier L1 and the conveyor system C, the bale B1 moves rearward into the second bale chamber 320. In the illustrated embodiment, the position of the second bale carrier L2, the third bale carrier L3, and the net wrap system N remain unchanged from FIG. 5. In some embodiments, the second bale carrier L2 is optionally higher or lower that its position in FIG. 5 to accommodate the size of the bale B1.

Figure 7:
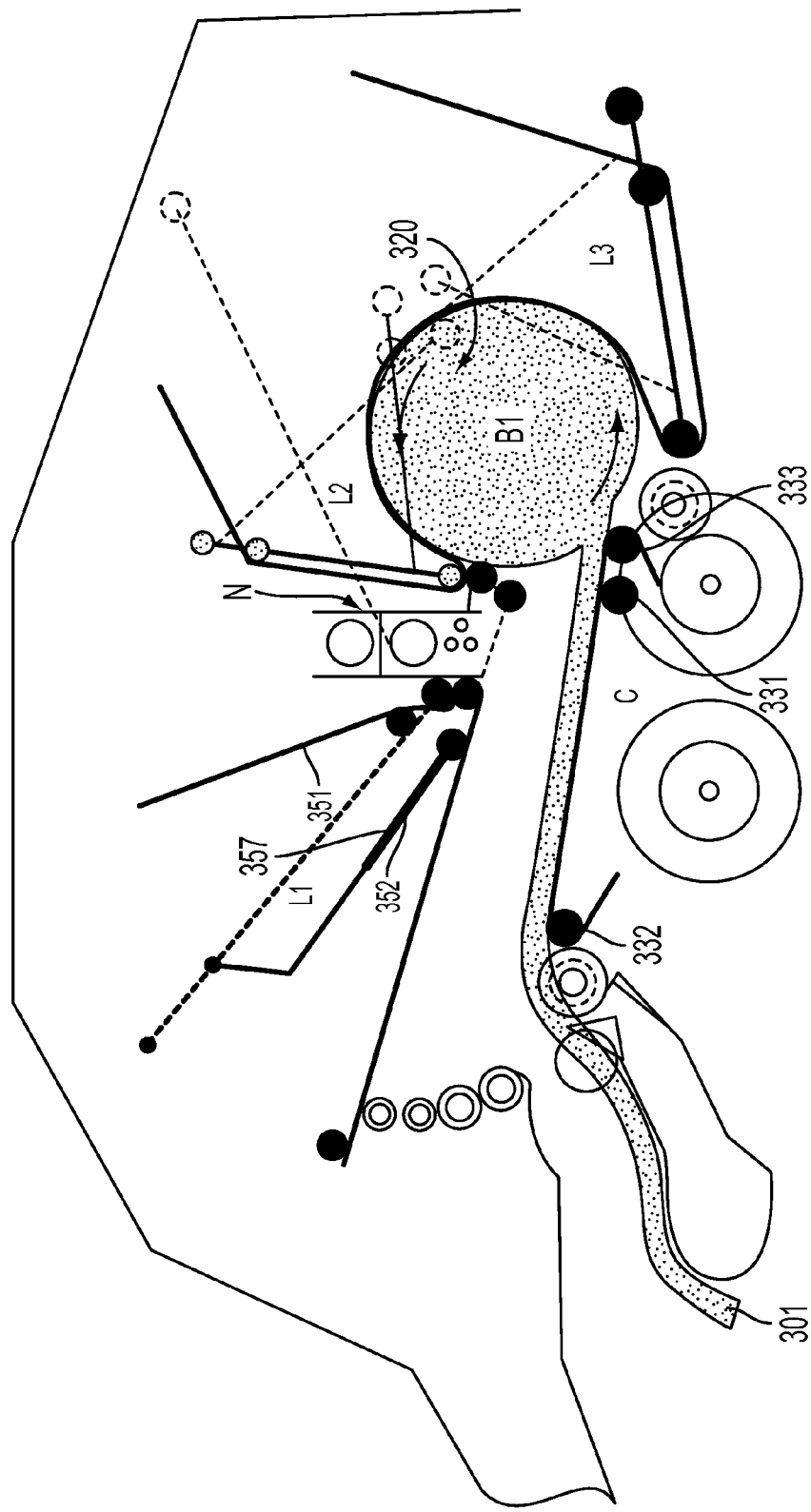

FIG. 7 depicts the series of events that occur sequentially or simultaneously after the steps in FIG. 6 have occurred. In FIG. 7, the crop 301 continues to be fed to the bale B1 by the conveyor system C during the bale transfer. In the illustrated embodiment, the first bale carrier L1 is in a partially open position, with the primary roller 351 and the kick roller 352 in the process of returning to their starting positions. In some embodiments, the kick roller 352 is being retracted by the extendable pair of arms 357. The position of the first bale carrier L1 does not restrict the movement of crop 301 to the bale B1. The position of the conveyor system C remains unchanged in relation to its position in FIG. 6. In the illustrated embodiment, the bale B1 is fully in the second bale chamber 320. The second bale carrier L2 is moving downward towards a closed position, while the third bale carrier L3 continues to remain in a fully closed position. In some embodiments, the net wrap system N moves downward in preparation of wrapping a completely formed bale.

Figure 8:
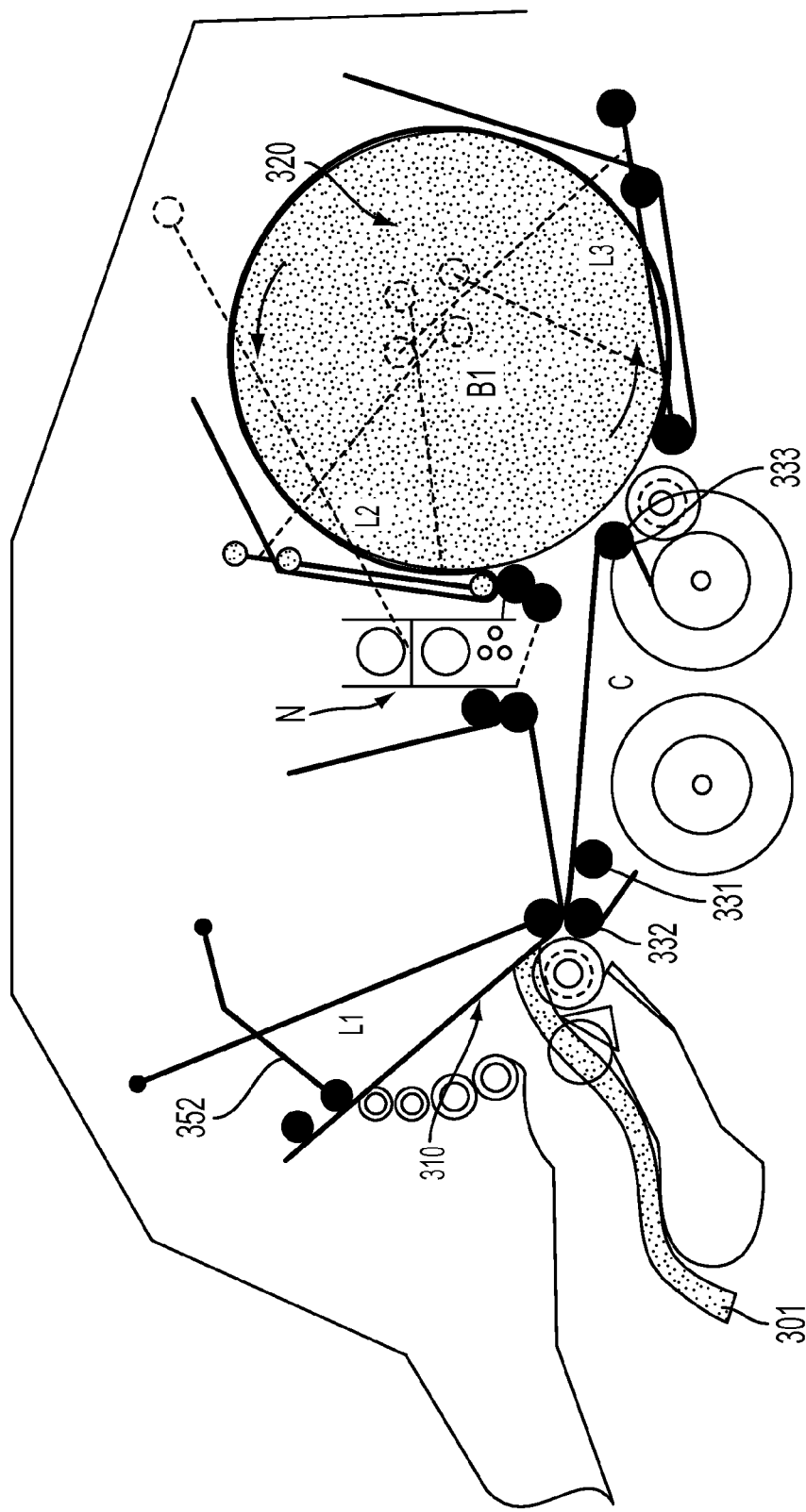

FIG. 8 depicts the series of events that occur sequentially or simultaneously after the steps in FIG. 7 have occurred and depending upon the size of the bale. In FIG. 8, once the bale B1 reaches the desired size, the first bale carrier L1 and the conveyor system C return to their starting positions as depicted in FIG. 3. The crop 301 is not fed to the bale B1, but instead is contained in the first bale chamber 310 by the first bale carrier L1 for the formation of a new bale. In the illustrated embodiment, the bale B1 is contained in the second bale chamber 320 by the fully closed second and third bale carriers L2 and L3. The net wrap system N is in its fully downward position. In some embodiments, the new wrap system N wraps the bale B1 when the bale is fully formed and the net wrap system N is in its fully downward position.

Figure 9:
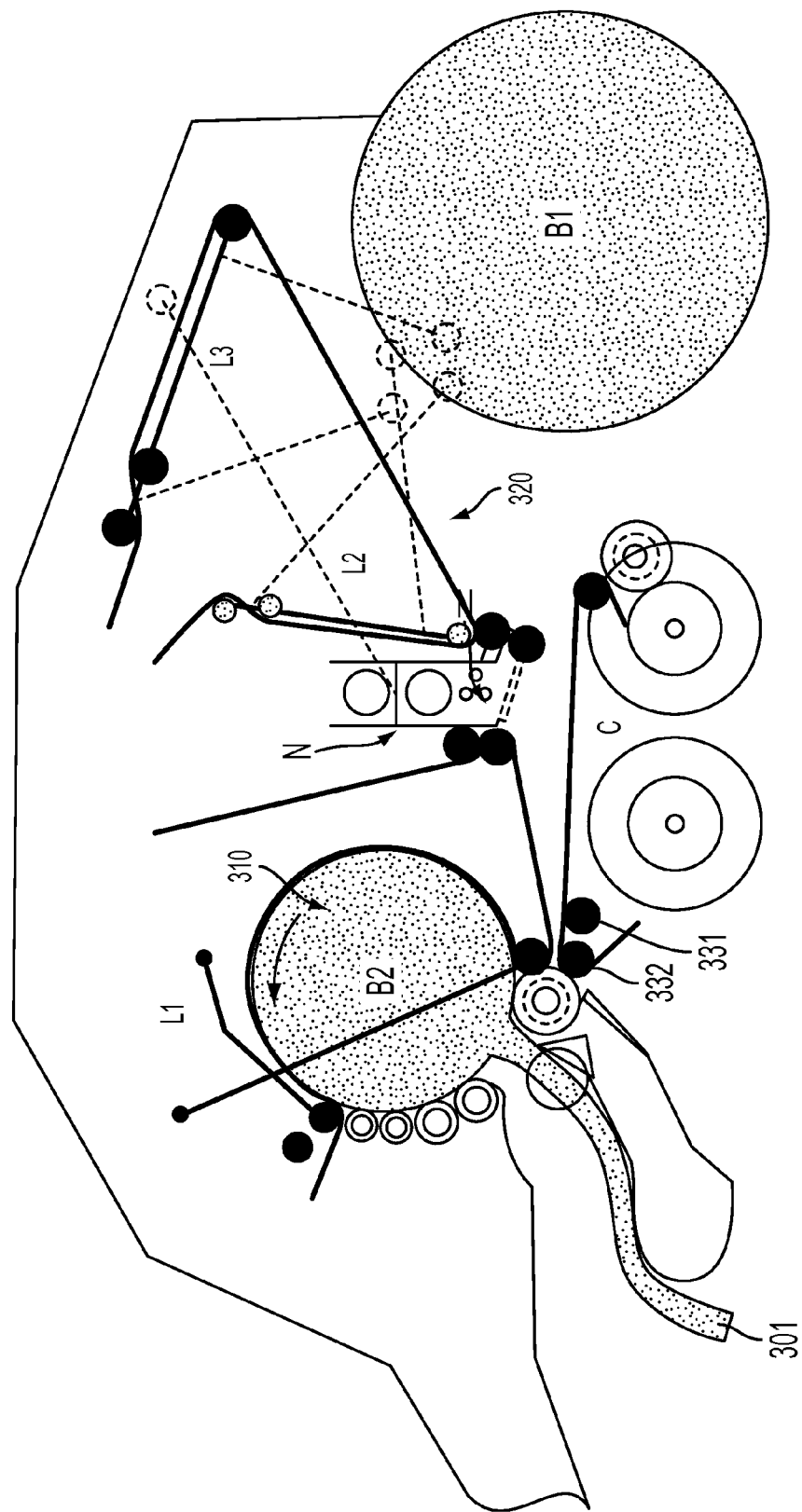

FIG. 9 depicts the series of events that occur sequentially or simultaneously after the steps in FIG. 8 have occurred. In FIG. 9, the crop 301 in fed into the first bale chamber 310 and rolled into a new bale B2. The positions are operations of the first bale carrier L1 and the conveyor system C are the same as depicted in FIG. 3. In the illustrated embodiment, the bale B1 is fully formed, wrapped, and ejected from the second bale chamber 320 onto the ground. The third bale carrier L3 moves upward to an open position to allow gravity to pull the bale B1 out of second bale chamber. The second bale carrier L2 is optionally in a closed position. In some embodiments, the second bale carrier is moving to an open position to prepare for the transfer of a new bale to the second bale chamber 320. The net wrap system N is in a downward position, having completed the wrapping of the bale B1. In some embodiments, the new wrap system N is moving upward to prepare for the transfer of a new bale to the second bale chamber 320. With the bale B1 ejected from the baler, the operational sequence would continue with the building of the new bale B2 as depicted in FIG. 3 or optionally the transfer of the new bale B2 as depicted in FIG. 4.

Figure 10:
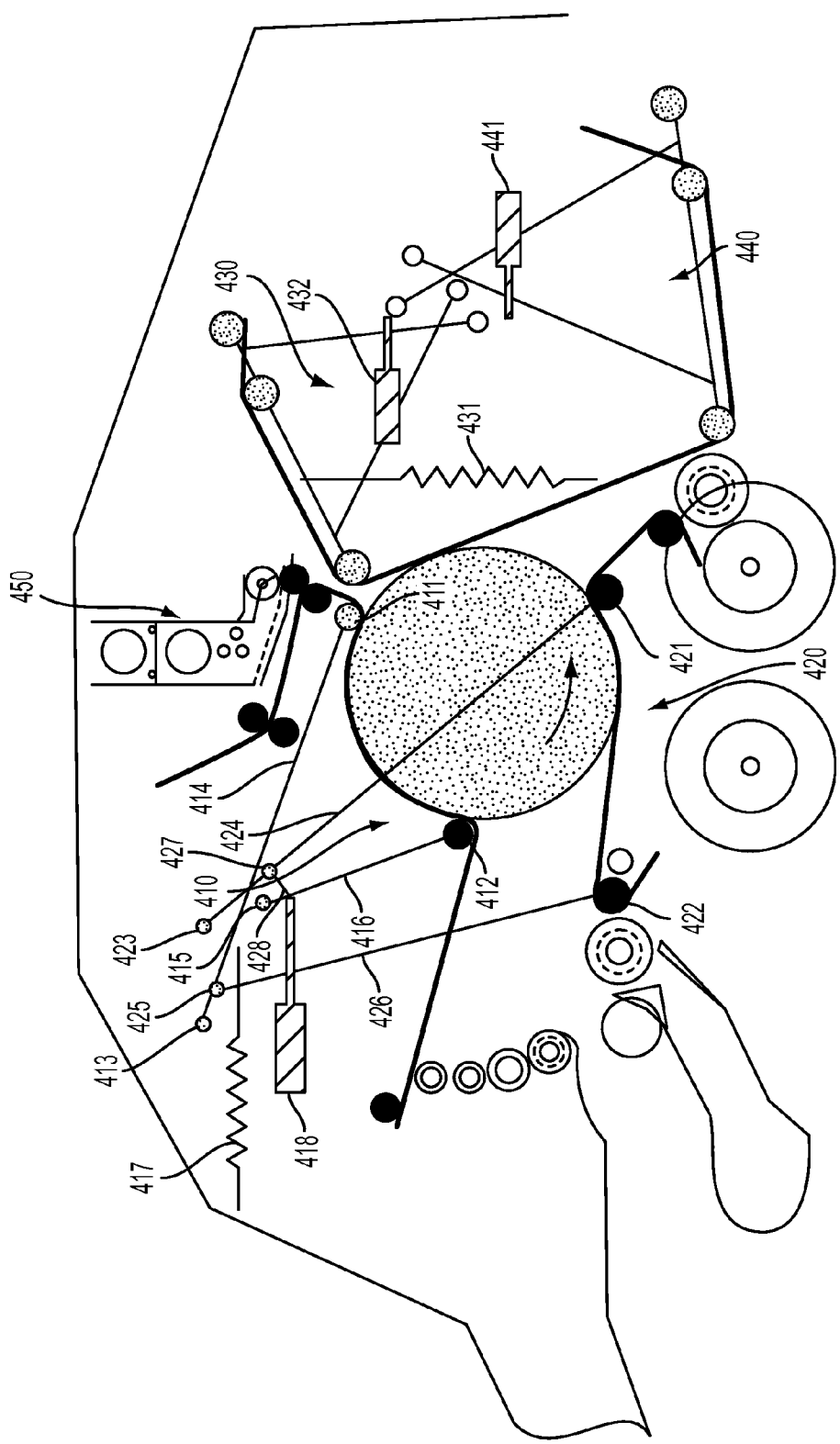
FIG. 10 depicts another embodiment of the continuous round baler where the movable rolls of the conveyor system are operably connected to the first bale carrier.

FIG. 10 depicts an alternative embodiment of the disclosure whereby the first bale carrier 410, containing the primary roller 411 and the kick roller 412 are operationally connected to the conveyor system 420, containing the first movable roller 421 and the second movable roller 422, by a series of mechanical arms. In the illustrated embodiment, the primary roller 411 is connected to a first pivot point 413 by a first pair of arms 414; the kick roller 412 is connected to a second pivot point 415 by a second pair of arms 416; the first movable roller 421 is connected to a third pivot point 423 by a third pair of arms 424; the second movable roller is connected to the first pair of movable arms 414 at a first movable junction 425 by a fourth pair of arms 426; and the second pair of arms 416 is connected to the third pair of arms 424 at a second movable junction 427 by a fifth pair of arms 428. To facilitate the movement of the mechanical arms, a first spring 417 is attached to the first pair of arms 414 and a first actuator 418 is attached to the second pair of arms 416.

FIG. 10 further depicts an alternative embodiment of the second and third bale carriers 430 and 440. A second spring 431 and a second actuator 432 is attached to the second bale carrier 430, and a third actuator 441 is attached to the third bale carrier, for the purpose of facilitating the movements of the second and third bale carrier. In some embodiments, the second spring 431 allows the second bale carrier 430 to easily follow the contour of a bale.

Figure 11:
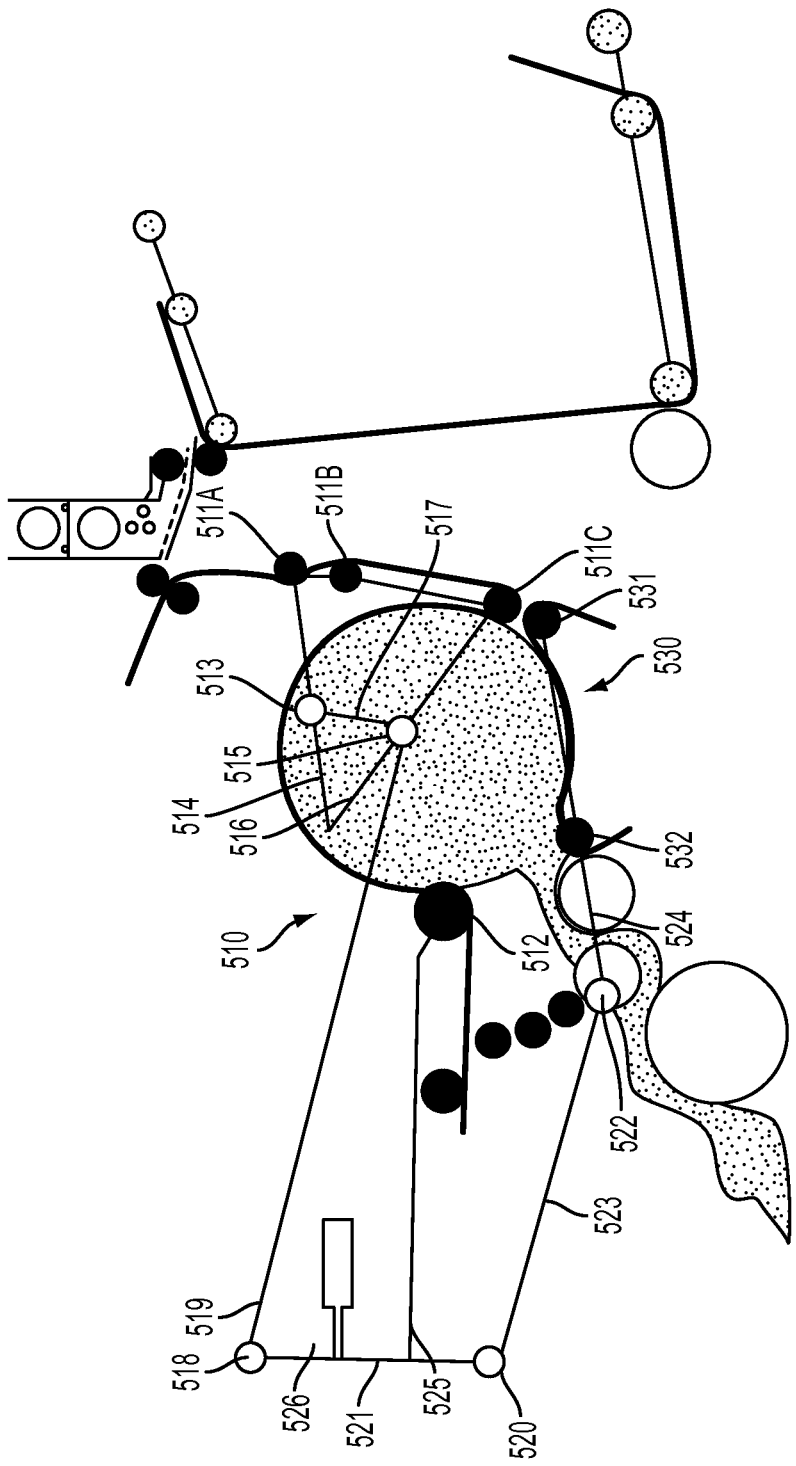
FIG. 11 depicts another embodiment of the continuous round baler where the components of one of the bale carriers contained within one of the serpentine systems are elongated.

FIG. 11 depicts another alternative embodiment of the disclosure whereby the first bale carrier 510, containing three primary rollers 511*a*, 511*b*, and 511*c* and the kick roller 512 are operationally connected to the conveyor system 530, containing the first movable roller 531 and the second movable roller 532 by a different series of mechanical arms. In the illustrated embodiment, the primary roller 511*a* is attached to a first movable junction 513 by a first pair of arms 514; the primary roller 511*b* is attached to a second movable junction 515 by a second pair of arms 516; and the first and second movable junctions 513 and 515 are connected by a third pair of arms 517. In some embodiments, the first and second movable junctions 513 and 515 are located in the middle of the first and second movable arms 514 and 516. In the illustrated embodiment, the second movable junction 515 is attached to a third movable junction 518 by a fourth pair of arms 519; the third movable junction 518 is also attached to a fourth movable junction 520 by a fifth pair of arms 521; and the fourth movable junction 520 is also attached to fifth movable junction 522 by a sixth pair of arms 523. In the illustrated embodiment, the first and second movable rollers 531 and 532 are attached to the fifth movable junction 522 by a pair of connecting arms 524; where the fifth movable junction 522, the second movable roller 532 and the first movable roller 531 are attached to the pair of connecting arms 524 in a serial fashion, such that the fifth movable junction 522 resides at one end of the pair of connecting arms, the first movable roller 531 resides at the opposite end of the pair of connections arms and the second movable roller 532 resides in the middle of the pair of connecting arms. In the illustrated embodiment, the kick roller 512 is attached to the fifth pair of arms 521 by a kicker arm 525. An actuator 526 is attached to the fifth pair of arms 521 to facilitate the movement of the mechanical arms, the primary rollers 511*a*, 511*b*, and 511*c*, the kick roller 512, the first movable roller 531 and the second movable roller 531.

In some embodiments, the actuator 526 facilitates movement of any one or more of the following: the first pair of arms 514, the second pair of arms 516, the third pair of arms 517, the fourth pair of arms 519, the fifth pair of arms 521, the sixth pair of arms 523, the primary rollers 511*a*, 511*b*, and 511*c*, the kick roller 512, the first movable roller 531 and the second movable roller 531 via predetermined slots located in a subframe.

In some embodiments, one or more of the following are attached to a moveable subframe: the first pair of arms 514, the second pair of arms 516, the third pair of arms 517, the fourth pair of arms 519, the fifth pair of arms 521, the sixth pair of arms 523, the primary rollers 511*a*, 511*b*, and 511*c*, the kick roller 512, the first movable roller 531 and the second movable roller 531.

In some embodiments, the actuator 526 facilitates movement of any one or more of the following: the first pair of arms 514, the second pair of arms 516, the third pair of arms 517, the fourth pair of arms 519, the fifth pair of arms 521, the sixth pair of arms 523, the primary rollers 511*a*, 511*b*, and 511*c*, the kick roller 512, the first movable roller 531 and the second movable roller 531 via a moveable subframe.

In some embodiments, the systems and harvesters disclosed herein comprise at least one controller that operates and is in electronic communication with at least one bale carrier. In some embodiments, the systems and harvesters disclosed herein comprise at least one sensors within or proximate to at least one bale chamber.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications is incorporated by reference herein, in its entirety.

What is claimed is:

1. A harvester comprising:
a first bale chamber and a second bale chamber operably coupled by a conveyor system; wherein the first bale chamber is positioned at one end of the harvester and the second bale chamber is positioned at the opposite end of the harvester;
wherein each of the first and second bale chambers comprise:
a first sidewall and a second sidewall,
an entry point at one end of the first and second bale chambers,
an outlet at the opposite end of the first and second bale chambers, and
at least one floor roller positioned at the bottom of each of the bale chambers transverse to the first and second sidewalls;
wherein the conveyor system is positioned between the first and second bale chambers and comprises one or a plurality of endless belts extending around and supported by at least one stationary roller and at least a first movable roller and a second movable roller;
wherein the at least one stationary roller and the at least first movable roller are positioned transverse to the first and second sidewalls and spin about a rotational axis;

and wherein the rotational axis of the at least first moveable roller is capable of movement in one or more operable positions independent of the rotational axis of the at least one stationary roller such that the position of the at least first movable roller creates more than two points of inflection in the one or plurality of endless belts;

wherein the harvester comprises at least a first operable condition in which the conveyor system facilitates a transfer of harvested material from the first bale chamber to the second bale chamber by synchronized movement of the at least first and second movable rollers, such that, upon transfer of harvested material from the first bale chamber to the second bale chamber, the first movable roller slides rearward, and optionally upward; and the second movable roller slides upward such that the position of the second movable roller is moved with respect to the position of the first movable roller.

2. The harvester of claim 1, wherein the second moveable roller rotating about a rotational axis, wherein the rotational axis of the at least first moveable roller and the rotational axis of the second movable roller are capable of movement in one or more operable positions independent of the axis of rotation of the at least one stationary roller such that the position of the at least first and the second movable roller create more than two points of inflection in the one or plurality of endless belts.

3. The harvester of claim 1, wherein the movement of the at least first movable roller exacts tension in the one or plurality of endless belts and creates a rearward moving point of contact between the harvested material and the one or plurality of endless belts during the transfer.

4. The harvester of claim 1, wherein the at least first movable roller is movable in at least a frontward and rearward direction relative to the orientation of the harvester.

5. The harvester of claim 1, wherein the second movable roller is movable in at least an upward and downward direction relative to the orientation of the harvester.

6. A harvester comprising:
a first bale chamber and a second bale chamber operably coupled by a conveyor system; wherein the first bale chamber is positioned at one end of the harvester and the second bale chamber is positioned at the opposite end of the harvester;
wherein each of the first and second bale chambers comprise:
a first sidewall and a second sidewall,
an entry point at one end of the first and second bale chambers,
an outlet at the opposite end of the first and second bale chambers, and
at least one floor roller positioned at the bottom of each of the bale chambers transverse to the first and second sidewalls;
wherein the conveyor system is positioned between the first and second bale chambers and comprises one or a plurality of endless belts extending around and supported by at least one stationary roller and at least a first movable roller and a second movable roller,
wherein the at least one stationary roller and the at least first movable roller are positioned transverse to the first and second sidewalls and spin about a rotational axis; and
wherein the rotational axis of the at least first moveable roller is capable of movement in one or more operable positions independent of the rotational axis of the at least one stationary roller such that the position of the at least first movable roller creates more than two points of inflection in the one or plurality of endless belts;
wherein the harvester comprises at least a first operable condition in which the conveyor system facilitates a transfer of harvested material from the first bale chamber to the second bale chamber by synchronized movement of the at least first and second movable rollers, such that, upon transfer of harvested material from the first bale chamber to the second bale chamber,
the first movable roller slides rearward, and optionally upward; and the second movable roller slides upward,
a harvesting assembly positioned on one end of the harvester and operably connected to the first bale chamber;
a first serpentine system arranged for the first bale chamber, the first serpentine system comprising:
a first bale carrier positioned at the outlet of the first bale chamber; and
a plurality of baling belt rollers in operable contact with one or more baling belts, the plurality of baling belt rollers comprising two lower baling belt rollers movable in an upward and downward direction independent of movement of any other baling belt rollers in the first serpentine system;
a second serpentine system arranged for the second bale chamber, the second serpentine system comprising:
a second bale carrier positioned at the entry point of the second bale chamber;
a third bale carrier positioned at the outlet of the second bale chamber; and
a plurality of baling belt rollers in operable contact with one or more baling belts, the plurality of baling belt rollers independently movable from any other roller in the second serpentine system; wherein the second and third bale carriers are in operable contact with the one or more baling belts.

7. The harvester of claim 6, wherein the first, second, and third bale carriers are movable among a closed position and one or more open positions, each bale carrier comprising:
a first pair of arms extending transversely from and affixed to a first pair of pivot points on the first and second sidewalls;
a second pair of arms extending transversely from and affixed to a second pair of pivot points on the first and second sidewalls;
one or more fixed members positioned at a distance defined by the length of the first and second pair of arms; and
a pair of parallel bars affixed to the one or more fixed members.

8. The harvester of claim 1, wherein the at least first movable roller of the conveyer system is operably synchronized with the at least first operable condition of the harvester, such that the first movable roller slides rearward, and optionally upward, upon transfer of a bale from the first bale chamber to the second bale chamber.

9. The harvester of claim 6, wherein the at least first and second movable rollers of the conveyor system are operably synchronized with the movement of the first bale carrier such that: the first movable roller slides rearward, and optionally upward, when the first bale carrier uncovers the outlet of the first bale chamber; and the second movable roller slides upward when the first bale carrier uncovers the outlet of the first bale chamber.

10. The harvester of claim 6, wherein the at least first movable roller is operably connected to at least one pivot point by at least one mechanical member, wherein the at least one pivot point is positioned above the first bale chamber in a forward, upper section of the harvester.

11. The harvester of claim 10, wherein the at least one pivot point is operably linked to the movement of the first bale carrier.

12. The harvester of claim 1, wherein the first movable roller of the conveyor system is capable of moving to one or a plurality of positions in a full rearward stroke defined as the distance between a position of the rotational axis of the first movable roller in a maximally frontward position and the position of the rotational axis of the first movable roller in a maximally rearward position relative to the orientation of the harvester, such that: at or substantially proximate to the middle of the full rearward stroke, the first movable roller is positioned upward and rearward relative to the maximally frontward position; and at or substantially proximate to its maximally rearward position, the first movable roller is positioned downward and rearward relative to its maximally frontward position.

13. The harvester of claim 6 further comprising at least a first, second, third and fourth operable conditions, wherein
the first operable condition comprises the first bale carrier in a fully closed position, the third bale carrier in a fully closed position and the first movable roller of the conveyor system in a maximally forward position, wherein the harvesting assembly facilitates movement of harvested material into the first bale chamber, wherein the first bale carrier in a fully closed position and the first movable roller in a maximally forward position facilitates formation of harvested crop material into a bale of a predetermined size, wherein the fully closed position of the third bale carrier optionally allows a wholly separate bale to exist in the second bale chamber prior to evacuation of the wholly separate bale from the harvester;
the second operable condition comprises the first bale carrier and the second bale carrier in a fully raised position, and the first movable roller of the conveyor system in a rearward position relative to its maximally forward position, wherein the fully raised positions of the first and second bale carriers and the rearward position of the first movable roller allows for exit of the bale from the first bale chamber to the second bale chamber; wherein the rotational axis of the first movable roller is moving to facilitate the transfer of the bale from the first to the second bale chamber;
the third operable condition comprises the second and the third bale carriers in a fully closed position, and the first movable roller of the conveyor system in a maximally rearward position, wherein the fully closed positions of the second and third bale carriers and the maximally rearward position of the first movable roller allows for crop to be transferred from the harvesting assembly, through the first bale chamber and into the second bale chamber;
the fourth operable condition comprises the first bale carrier and second bale carrier in a fully closed position, the third bale carrier in a fully raised position, and the first movable roller of the conveyor system in a position forward of its position in the third operable condition, wherein the fully raised position of the third bale carrier allows evacuation of the bale from the harvester.

14. The harvester of claim 6, wherein the harvester further comprises a net wrapping mechanism in or proximate to the second bale chamber optionally positioned under the third bale carrier or above the second bale carrier in the front of the second bale chamber.

15. The harvester of claim 7, wherein the harvester further comprises at least one tensioning actuator operatively coupled to the first pair of arms and/or the second pair of arms and the at least first, second, and/or third bale carrier for facilitating the upward or downward movement of the at least first, second, and/or third bale carrier.

16. The harvester of claim 7, wherein the harvester optionally comprises:
a lengthened first pair of arms extending transversely from and affixed to a third pair of pivot points on the first and second sidewalls, wherein the third pair of pivot points are located forward in relation to the first pair of pivot points; and
a lengthened second pair of arms extending transversely from and affixed to a fourth pair of pivot points on the first and second sidewalls, wherein the fourth pair of pivot points are located forward in relation to the second pair of pivot points;
wherein the conveyor system is optionally positioned fully in the first bale chamber.

17. The harvester of claim 1, wherein the harvester is chosen from a round baler, a cotton harvester, a waste baler, or a combine.

18. A method of harvesting material in a harvester, said method comprising:
(a) feeding material from a harvesting assembly into a first bale chamber;
(b) forming a partially formed bale in the first bale chamber to a desired size;
(c) transferring the partially formed bale from the first bale chamber to a second bale chamber on a conveyor system;
(d) completing bale formation in the second bale chamber; and
(e) ejecting the completed bale from the second bale chamber contemporaneously with initiating step (a) in a new sequence of steps (a) through (d);
wherein the harvester comprises:
the first bale chamber and the second bale chamber operably coupled by the conveyor system;
wherein the first bale chamber is positioned at one end of the baler and the second bale chamber is positioned at the opposite end of the baler;
wherein each of the first and second bale chambers comprise:
a first sidewall and a second sidewall,
an entry point at one end of the first and second bale chambers,
an outlet at the opposite end of the first and second bale chambers, and
at least one floor roller positioned at the bottom of each of the bale chambers transverse to the first and second sidewalls;
wherein the conveyor system is positioned between the first and second bale chambers and comprises one or a plurality of endless belts extending around and supported by at least one stationary roller and at least a first movable roller and a second movable roller;
wherein the at least one stationary roller and the at least first movable roller are positioned transverse to the first and second sidewalls and spin about a rotational axis; and
wherein the rotational axis of the at least first moveable roller is capable of movement in one or more operable positions independent of the rotational axis of the at least one stationary roller such that the position of the at least first movable roller creates more than two points of inflection in the one or plurality of endless belts;

wherein the harvester comprises at least a first operable condition in which the conveyor system facilitates a transfer of harvested material from the first bale chamber to the second bale chamber by synchronized movement of the at least first and second movable rollers, such that, upon transfer of harvested material from the first bale chamber to the second bale chamber, the first movable roller slides rearward, and optionally upward; and the second movable roller slides upward, wherein a height of the first movable roller is changed with respect to a height position of the second movable roller.

19. A harvester comprising:

a first bale chamber and a second bale chamber operably coupled by a conveyor system;

wherein the first bale chamber is positioned at one end of the baler and the second bale chamber is positioned at the opposite end of the baler;

wherein each of the first and second bale chambers comprise:

a first sidewall and a second sidewall, an entry point at one end of the first and second bale chambers, an outlet at the opposite end of the first and second bale chambers, and at least one floor roller positioned at the bottom of each of the bale chambers transverse to the first and second sidewalls;

wherein the conveyor system is positioned between the first and second bale chambers and comprises one or a plurality of endless belts extending around and supported by at least one stationary roller and at least a first movable roller;

wherein the at least one stationary roller and the at least first movable roller are positioned transverse to the first and second sidewalls and spin about a rotational axis; and wherein the rotational axis of the at least first moveable roller is capable of movement in one or more operable positions independent of the rotational axis of the at least one stationary roller such that the position of the at least first movable roller creates more than two points of inflection in the one or plurality of endless belts; wherein the at least first movable roller is configured to be displaced with respect to the at least stationary roller and move rearward with transferred crop material toward the second bale chamber during a transfer operation of the crop material from the first bale chamber to the second bale chamber.

20. The harvester of claim 19, wherein the at least first movable roller is operably connected to at least one pivot point by at least one mechanical member; wherein the at least one pivot point is positioned above the first bale chamber in a forward, upper section of the harvester and the at least one pivot point is operably linked to the movement of the first bale carrier.

* * * * *